(12) United States Patent
Gough et al.

(10) Patent No.: US 7,719,542 B1
(45) Date of Patent: May 18, 2010

(54) SYSTEM, METHOD AND USER INTERFACE CONTROLS FOR COMMUNICATING STATUS INFORMATION

(75) Inventors: Michael Gough, Middletown, CA (US); Mike Sundermeyer, Palo Alto, CA (US); Andrew Lin, San Francisco, CA (US); Jerry Knight, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 154 days.

(21) Appl. No.: 10/683,419

(22) Filed: Oct. 10, 2003

(51) Int. Cl.
  *G09G 5/00* (2006.01)
(52) U.S. Cl. .................... 345/581; 345/589; 345/619; 715/781; 715/802; 715/803; 715/821; 715/822; 715/823; 715/824; 715/860
(58) Field of Classification Search .............. 345/689, 345/802, 803, 821–824
See application file for complete search history.

(56) References Cited

U.S. PATENT DOCUMENTS

| | | | |
|---|---|---|---|
| 5,590,267 A | 12/1996 | Butler et al. | |
| 5,760,769 A | 6/1998 | Petrie | |
| 5,790,127 A | 8/1998 | Anderson et al. | |
| 5,917,487 A | 6/1999 | Ulrich | |
| 6,057,835 A | 5/2000 | Sato et al. | |
| 6,181,316 B1 | 1/2001 | Little et al. | |
| 6,445,400 B1 | 9/2002 | Maddalozzo et al. | |
| 6,559,871 B1 | 5/2003 | Brozowski et al. | |
| 6,826,729 B1 * | 11/2004 | Giesen et al. | 715/837 |
| 6,907,575 B2 | 6/2005 | Duarte | |
| 6,959,422 B2 | 10/2005 | Slaunwhite et al. | |
| 2003/0174170 A1 | 9/2003 | Jung et al. | |
| 2003/0231218 A1 | 12/2003 | Amadio | |
| 2004/0113948 A1 | 6/2004 | Shahrbabaki et al. | |
| 2004/0261038 A1 * | 12/2004 | Ording et al. | 715/792 |
| 2006/0150103 A1 | 7/2006 | Chicles et al. | |

OTHER PUBLICATIONS

Brown, J. Robert, "X Window Programming from Scratch," Que Corporation, 2000, Chapters 4, 5, and 13.*
"Xwindows mouse functionality," http://www.windowsnetworking.com/kbase/WindowsTips/WindowsNT/RegistryTips/Hardware/Xwindowsmousefunctionality.html.*
Gehrig, Peter and Dudli, Urs. "Dynamic Change of textglow on mousemove." http://www.24fun.com. Copyright (c) 2000 Peter Gehrig and Urs Dudli. Date accessed Aug. 7, 2006 via http://www.hypergurl.com/glowtext.html.*
Gehrig, Peter and Dudli, Urs. "Dynamic Change of textglow on mousemove." http://www.24fun.com. Copyright (c) 2000 Peter Gehrig and Urs Dudli. Date accessed May 31, 2007 via http://www.hypergurl.com/glowtext.html. Screenshots 1-4 of the mousemove in action and code to implement the effect.*
Isaacs, Scott. "Inside Technique : Hover Effects." "Inside Dynamic HTML—Hover Effects" (http://www.siteexperts.com/tips/styles/ts31/page1.asp). Copyright 1997-2000. InsideDHTML.com, LLC. All rights reserved. Accessed on May 31, 2007.*

(Continued)

*Primary Examiner*—Antonio A Caschera
(74) *Attorney, Agent, or Firm*—Fish & Richardson P.C.

(57) ABSTRACT

A system and method displays a gradient of color extending outward from the border of a user interface control such as a text box, list box, check box, radio button, scroll bar or message box. The display may be made in response to an event, such as a mouse over or error. A user interface control has such a gradient of color.

12 Claims, 8 Drawing Sheets

OTHER PUBLICATIONS

Apple Computer, Inc., Jun. 2002, "InsideMacOS X Aqua, Human Interface Guidelines", accessed via the Web from http://www.interface.free.fr/Archives/AquaHIGuidelines.pdf, pp. 233.*

Apple Computer, Inc., Jun. 2002, "InsideMacOS X Aqua, Human Interface Guidelines", accessed via the Web from http://www.interface.free.fr/Archives/AquaHIGuidelines.pdf, pp. 144-146.*

Sundermeyer, et al. "System, Method And List Box User Interface Controls For Communicating Status Information", U.S. Appl. No. 10/683,417, filed Oct. 10, 2003, 56 pages.

Thompson, "Internet Explorer Toolbar (Deskband) Tutorial", retrieved from the internet at http://www.codeproject.com/atl/ietoolbartutorial.asp, Aug. 22, 2001, pp. 1-28.

Apple Computer, Inc., Jun. 2002, "InsideMacOS X Aqua, Human Interface Guidelines", obtained from http://interface.free.fr/Archives/AquaHIGuidelines.pdf, pp. 77, 85, 119, 148, 167, 179, 182-183, and 294.

U.S. Appl. No. 10/683,417, Office Action mailed Oct. 11, 2006.

U.S. Appl. No. 10/683,417, Office Action mailed Apr. 4, 2007.

U.S. Appl. No. 10/683,417, Office Action mailed Sep. 19, 2007.

* cited by examiner

SYSTEM, METHOD AND USER INTERFACE CONTROLS FOR COMMUNICATING STATUS INFORMATION

FIELD OF THE INVENTION

The present invention is related to computer system user interface controls and more specifically to computer system user interface controls that display status information.

BACKGROUND OF THE INVENTION

Some computer software employs user interface controls to allow the user to provide input and/or identify status. User interface controls can include text boxes to allow the user to enter text, list boxes to allow a user to select an item from a list of items or a tree-structure, such as a list of files stored in a directory, check boxes to change or display status, radio buttons to allow a mutually exclusive selection to be made from a list of items and other similar controls. Other user interface controls include scrollbars, used to indicate and control the relative position of information displayed when more information exists than is displayed on the screen at one time, and message boxes which display an informational message (e.g. "A file with that name already exists. Do you want to replace the existing file?") and may display buttons to receive input from the user (e.g. "Yes", "No" and "Cancel").

Using conventional user interface controls can be cumbersome for the user. For example, once a user has selected a text box, the user may type text into the box using a cursor that is displayed as a small line inside the text box that has been most recently selected. If the user is temporarily distracted, when the user returns his or her attention to the user interface, it can be difficult to identify which control is currently selected by searching for the text box control that has the small cursor displayed. Some users use a tab selection capability for user interface controls that allows the user to use the tab key and shift-tab key to select a user interface control. Here too, conventional user interface controls do not allow the user to identify the currently selected user interface control without searching through various user interface controls located on the page to identify which user interface control is currently selected. Even if the user interface control is nearby a previously-selected user interface control, if the user is distracted, it can be difficult to locate the currently-selected user interface control.

Once the user has employed the user interface control to enter text or make a selection, an error may be detected by the application program logic that processes the information. For example, if the user is requested to enter his or her phone number in "NNN-NNN-NNNN" format, and the user enters 555-0100, the user has made an error by forgetting the area code. Conventional software may display a message box or text on the display to identify the error, but the user is still required to locate the user interface control on the page that contains the error in order to make the correction. This can require the user to search through many user interface controls and other information that may be displayed on the display screen, a cumbersome task.

User interface controls can be easier to use if the user receives feedback for the actions the user performs. For example, it can be easier to identify which control the mouse is currently over if the control provides some form of visual feedback of that event. It can also be helpful to allow the user to see that the control is being actuated, for example, changing the color of a button when it is being pressed. Some user interface controls do not provide any such feedback, making it harder for the user to use the user interface controls provided because the user has to continually search for the mouse cursor on the screen.

There is a tension between providing the space needed to allow a user interface control to indicate feedback and the desire to fit as much information onto the screen as compactly as possible without making the screen appear cluttered. For example, the conventional Motif operating system specified that user interface controls could employ a thick border around the control to indicate the currently-selected control. However, because the border is so thick, sufficient space must be left between controls not only to allow the border to be displayed, but also to allow the page on which the controls, one of which contains the border, to not appear too cluttered. Some systems such as Windows draw a faint, dotted border around certain currently-selected controls, but the border is too faint to allow the user to quickly receive the indication of feedback.

Other approaches include tooltips, whereby small, explanatory boxes pop up to provide feedback, but this takes up valuable screen space, if only temporarily, and therefore, have not solved the problem of providing feedback without taking up significant screen real estate because during the time the tooltip is displayed, it can block other portions of the screen that display information the user may wish to view.

Some user interface controls, such as certain controls provided on the RealOne Player product commercially available at the web site of real.com provide such feedback on buttons only, by means of an icon located inside the button that changes color upon mouse-over of buttons, and a bezel (a band surrounding the button) that indicates when the button is pressed by changing color. However, such feedback is too limited to be of general use on a page with other controls because the other controls provide no similar feedback. For example, the other RealOne player user interface controls such as text boxes do not provide any indication of a mouse over event. Because of this lack of consistency, the user does not develop an intuitive feel for the page containing the controls to allow the user to rely on even the rudimentary status information provided by the buttons that provide such status.

Furthermore, the RealOne approach is not particularly effective. The bezel is too small to allow the status to be easily seen, yet the bezel, and the icon, makes the buttons much larger that they would need to be without them, taking up valuable screen space, yet serving no function when the screen space they take up isn't being used to display status. Thus, using the approach of the Real Player, fewer controls can appear on the screen without making the screen appear to be overly crowded.

What is needed is a system and method that can provide a variety of easily-seen feedback for user actions related to user interface controls, yet allows the user interface controls to remain compact.

SUMMARY OF INVENTION

A system, method and user interface control shows a border of the control, with a gradient of color displayed extending from the border at times, for example, to indicate an event, such as a mouse over, selection of the user interface control, or an error. A different color may be used to distinguish between the events indicated, such as using green for a mouse over or selection of the control and red for an error.

DETAILED DESCRIPTION OF A PREFERRED EMBODIMENT

Figure 1:
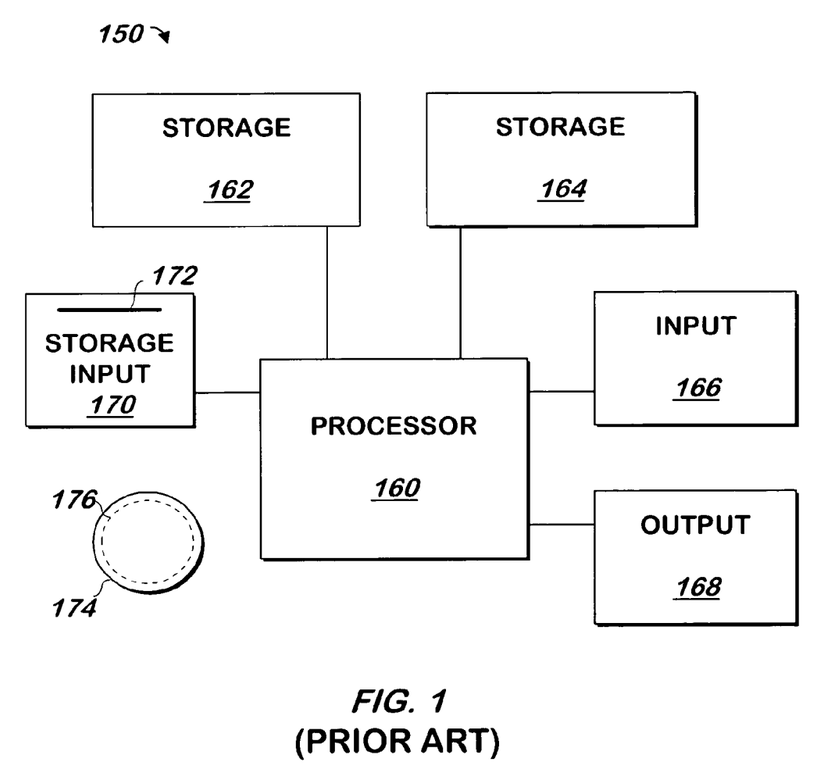
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond, Wash. or a Macintosh computer system running the MACOS, OPENSTEP or OS X operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Figure 2:
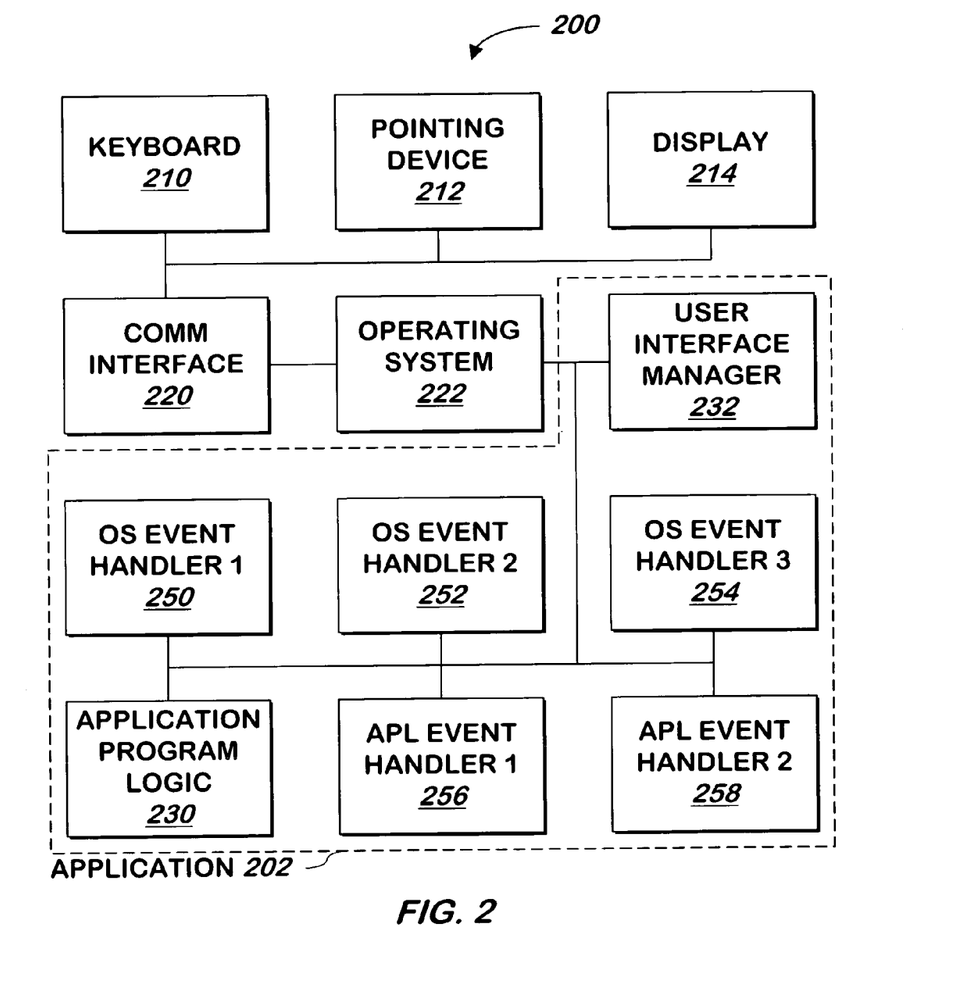
FIG. 2 is a block schematic diagram of a system for providing feedback for user interface controls according to one embodiment of the present invention.

FIG. 2 is a block schematic diagram of a computer system 200 including a system 202 for providing feedback for user interface controls according to one embodiment of the present invention. Referring now to FIG. 2, system 200 contains a conventional computer software application 202 that displays a user interface. Computer system 200 also contains any or all of conventional keyboard 210, pointing device 212 such as a conventional mouse or trackball, and display 214, each coupled to a communications interface 220 which contains a any number of conventional hardware interfaces suitable for communication with such devices 210-214. Communication interface 220 is under control of operating system 222, which may be any conventional operating system, such as any of those described above.

When the user requests operating system 222 to run application program 202, operating system 222 loads application program 202 into conventional system memory such as conventional RAM, and transfers control to application program logic 230, which contains conventional application program logic and the data used by the application program logic. Application program logic 230 may perform conventional application program initialization, and then signals user interface manager 232 with an identifier of the user interface that should be displayed based on the application program logic, which at this point may indicate that the program is being started.

User interface manager 232 initializes data and certain status variables related to the user interface controls on the user interface corresponding to the identifier it receives, binds certain user interface controls to variables and provides operating, system with sufficient information to allow operating system to display each of the user interface controls in one or more windows on display 214.

In addition, user interface manager 232 may register operating system event handlers 250-254 to operating system 222, one per control per type of operating system event to which the user interface controls or application program logic 230 will respond. Although only three operating system event handlers 250-254 are shown in the Figure, there may be any number of operating system event handlers used, depending on the events to be handled and the number of user interface controls on the main window or its descendant windows.

An "operating system event" is any event, such as a conventional WINDOWS event or other similar event that occurs when the user performs an action related to a user interface control, such as the user positioning the mouse cursor over a user interface control ("mouse over" of the control), a user selecting a control by positioning the mouse cursor over the control and then clicking it, or using the tab button on the keyboard to move the selection from one control to another in a tab order of the controls specified by user interface manager 232 when it registers the controls (which causes "selection" of the control, and either getting or losing "focus", depending on whether the control had focus before the action), a user selecting a different control from a control that had been selected or otherwise unselecting the control, for example, by moving the mouse cursor away from the control and clicking the mouse (the formerly selected control "loses focus") or any other conventional WINDOWS event associated with a user interface control or other similar events. As noted below, an "operating system event" can be, but need not be, detected or generated by an operating system, as it can be detected or generated by a shell, a driver, a program, a hardware interface or any other entity that can detect user actions.

(Operating system event handlers 250-254 are described herein as being used to display each of the various user interface controls described herein, and then elsewhere in the description, those same operating system event handlers 250-254 are described as being used to display a different user interface control, which would occur if a page had only one such user interface control. In the event that the page had more than one user interface control, each control could use its own operating system event handler.)

As described herein, a semi-transparent gradient of color is overlaid over the conventional user interface controls provided by conventional operating systems. However, it isn't necessary to use the user interface controls provided by the operating system 222. In one embodiment, user interface controls are drawn by user interface manager 232 and the various event handlers 250-258 as described herein, and user interface manager 232 monitors the position and activity of the pointing device 212 and transfers control to the appropriate operating system event handlers 250-254 as described below, replacing that function and the display of status information in response or supplementing it with operating system 222.

As an example of a control and its responses to operating system events and other events, a text box that is used to type text to an application will now be used for purposes of illustration. When user interface manager 232 defines the control to operating system 222, it will have an appearance of a white box with gray borders with shadowing that makes the control appear to be indented on the page and lit from above. In one embodiment, shadowing is achieved via a gradient of gray that gradually turns to white within a few pixels inside the border of the control.

When the user selects the control by clicking in it, an onclicked event is generated for the control. Program control is transferred to the operating system event handlers 250-254 that handles that operating system event for that control. As described herein, operating system event handler 254 will be used to handle such event. In one embodiment, operating system event handler 254 displays to the user the selected state of the control by visually changing the state of the control by drawing a transparent indicator over the border of the control or using other techniques that achieve the same or similar effect.

As described herein, the indicator is drawn over the control or removed from the control by the event handlers 250-258, but in another embodiment, each event handler 250-258 requests operating system 222 to redraw the control, either with the indicator or without the indicator, after such event handler has added the indicator to the control or removed the indicator from the control.

In one embodiment, the indicator has the appearance of a colored halo, with the centerline of the halo overlaying the border of the control, although in another embodiment, the indicator is only drawn over a portion of the border of the control, or some or all of the interior or immediately adjacent to the border of the control.

In one embodiment, the halo is a colored line that is thicker than any border of the control and has a gradient of color that runs from the color of the indicator at a central portion of the line and gradually approaches white (or a different color such as the background color of the screen on which the indicator is drawn) towards one or both outer edges of the line. Thus, in one embodiment, the line appears like a thin, lit, translucent neon light would appear over the control, with the center of the line along its length being the color of the indicator, and the appearance of color emanating, and gradually decreasing from the light. The control is visible underneath the "neon light", so that the indicator does not hide the border of the control, but is added over it in a semi-transparent manner. In one embodiment, the color used for the indicator for an operating system event is green or other color associated with a positive outcome, although as noted below, the color may be selected by application program logic 230.

When the control loses focus, operating system 222 detects the event and transfers control to operating system event handler 252. Operating system event handler 252 removes the indicator from the control and either signals operating system 222 to redraw the control, or redraws the control itself and signals operating system 222 to refresh the page. This has the effect of "turning the indicator off" so that it is no longer displayed with the control, to indicate that the control has lost focus.

In one embodiment, indicators for some controls are not only displayed or not displayed in response to operating system events as described above, but may also, or may instead, be displayed in response to events generated by application program logic 230. Such events may include the detection of the use of one or more controls in any improper manner, such as using a text box to enter data in a format other than what is expected by application program logic 230 or otherwise entering erroneous or nonsensical data or making an erroneous or nonsensical selection, or not entering data or not making a selection when such data or selection is required by application program logic 230.

For example, if the user enters a misspelling of a city in a text box control, such as "San Farnciso", when the user presses the enter key or causes the control to lose focus, the event handler that processes the event will transfer control to a portion of application program logic that parses the text in the control and identifies errors. Because the city is misspelled, application program logic 230 identifies the city as being improperly spelled using conventional techniques. In such embodiment, application program logic 230 identifies an error. Although the event is described herein as an error occurring, other logic events may be used to cause an indication to be displayed, such as a winning number being entered.

Application program logic 230 then identifies whether an indication of the event should be displayed or cleared. In one embodiment, application program logic maintains a status variable describing whether the event such as the error had been detected previously. If the state of the event has changed (i.e. the variable indicates the prior state as a non-error state and the state is different because an error has been detected by application program logic 230, or the variable indicates that the prior state was the error state and application program logic 230 identifies no error has occurred), application program logic 230 changes the state variable to match the current state and transfers control to the application program logic event handler 256-258 that handles setting or clearing an indication on the one or more user interface controls at issue, e.g. the control that was used to enter the error.

For each one or more control that can have an error or other state for which the display of an indication on the control or controls related to or containing the error is desired, there may be provided an application program logic event handler 256-258. For purpose of example, application program logic 230 signals application program logic event handler 256 upon such detection of a change of state.

Application program logic event handler 256 then checks the error status variable for that control and, if it is set, displays the control in a manner that indicates the error state. In one embodiment, application program logic event handler 256 indicates the error in the same manner as operating system event handler 254 displays the selected state of the control as described above, except that application program logic event handler 254 uses a different color that indicates an error or alarm condition, such as red, though this color may be set by application program logic 230.

As described herein, the gradient of color does not itself interfere with the operation of the control. The user is otherwise able to use the control in the manner of a conventional user interface control whether or not the gradient of color is displayed.

There may be two or more such controls that are used to detect an error, e.g. one that requests a city and another that requests a zip code. If the user enters a zip code that does not match the city, it may be desirable to provide an indication of the error displayed on both the user interface controls into which the city and zip code were entered to allow the user to check them both and correct the error in one or both of them. In such embodiment, both controls may be highlighted as described above by application program logic event handler 256 or there may be two application program logic event handlers 256-258, each highlighting a different one of the user interface controls, that are both signaled by application program logic 230 upon detection of the error or one handler 256-258 may signal the other after being signaled by application program logic 230.

When the user completes using the control to make a selection, type text, or perform other conventional user interface functions, the user may press the enter key, use the tab key to move to the next user interface control or perform another action that indicates that the user is done with the control, such as by clicking on another portion of the page.

For example, if the user presses the enter key, the control will keep the focus, but control may return to application program logic 230 (which may contain other event handlers that are not related to the highlighting of user interface controls as described herein, or may contain code that is initiated by event handlers 250-258, which checks the selection or text received. If application program logic 230 detects an error, application program logic 230 checks the error status variable and, if the error status variable is set and an error has occurred, in one embodiment, application program logic 230 does nothing, and in another embodiment, application program logic 230 transfers control to application program logic event handler 256, which re-indicates the error as described above. If application program logic 230 does not detect an error but the error status variable is set, application program logic 230 clears the error status variable and transfers control to application program logic event handler 256, which redraws the control as described above without the indication of the error because the status variable is not set.

The user may then manipulate the user interface controls on the window or windows being displayed, which may extend beyond the edges of display 214, being accessible via scroll bars or the like, enter text, make selections or perform other actions using the user interface controls, and make selections from a menu that is also registered by user interface manager 232.

Figure 3A:
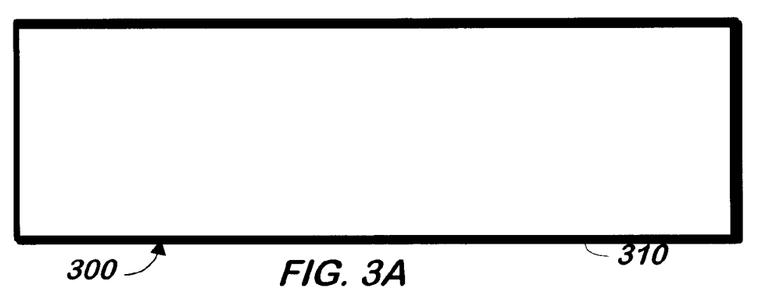
FIGS. 3A-D are diagrams of a representative user interface control, a text box, according to certain embodiments of the present invention.
Figure 3B:
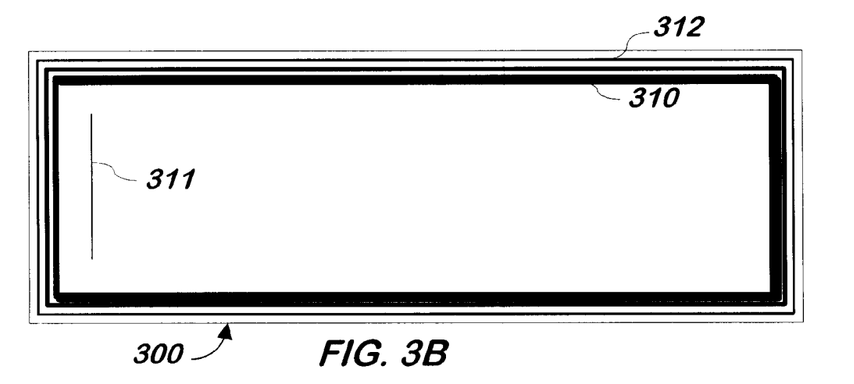

Referring now to FIGS. 3A-3D, a representative user interface control is shown according to one embodiment of the present invention. The user interface control 300 shown in each of FIGS. 3A-3D is the same user interface control 300, but in different states at different points in time, as has been described above and will now be described. FIG. 3A shows an unselected user interface control 300, which in this case is a text box. User interface control 300 contains a border 310, with an adjacent pair of the sides of the border 310 being thicker than the opposing two sides to provide the illusion of depth due to shadowing. FIG. 3B illustrates the user interface control 300 in its selected state. A conventional text cursor 311 is visible in the control 300 because of its selected state. In addition, the user interface control 300 has a gradient of color 312, (which, to comply with the patent drawing rules, is represented by the concentric boxes that become thinner and thinner as they get further from the border 300 to simulate the color gradient, although the thickness of the gradient of color may be much smaller than is shown, being only a few pixels wider than the border 310 on either side of the border). The gradient of color extends outside the border 310 of control 300 and may extend inside the border 310, either in addition to, or in place of, the gradient extending outside border 310. The gradient in this case indicates the selected state of control 310 as described above.

Figure 3C:
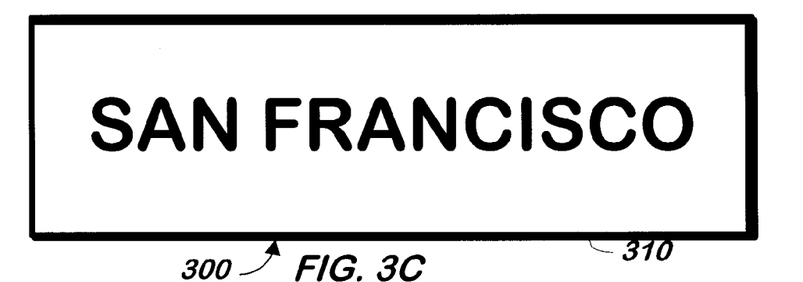
Figure 3D:
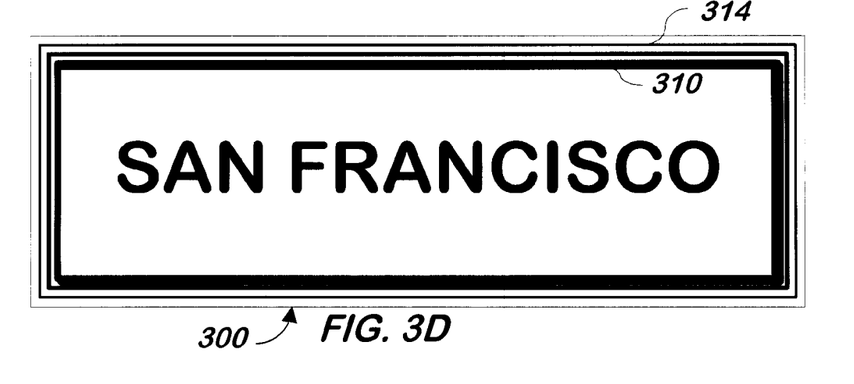

When the control 300 loses focus, as noted above, if no errors are identified by the application program logic, the control 300 will have the appearance similar to its initial state. As shown in FIG. 3C, no color gradient appears near the border 310 of the control 300 as it did in FIG. 3B, because the control 300 has lost focus and the application program has detected no errors that would otherwise be used as a basis to highlight it. If the application program did detect a basis for highlighting the control, for example, to indicate an error, the control would appear as it does in FIG. 3D, with a gradient of color 314 that has a different color from the gradient of color 312 of FIG. 3B as described above.

Figure 4:
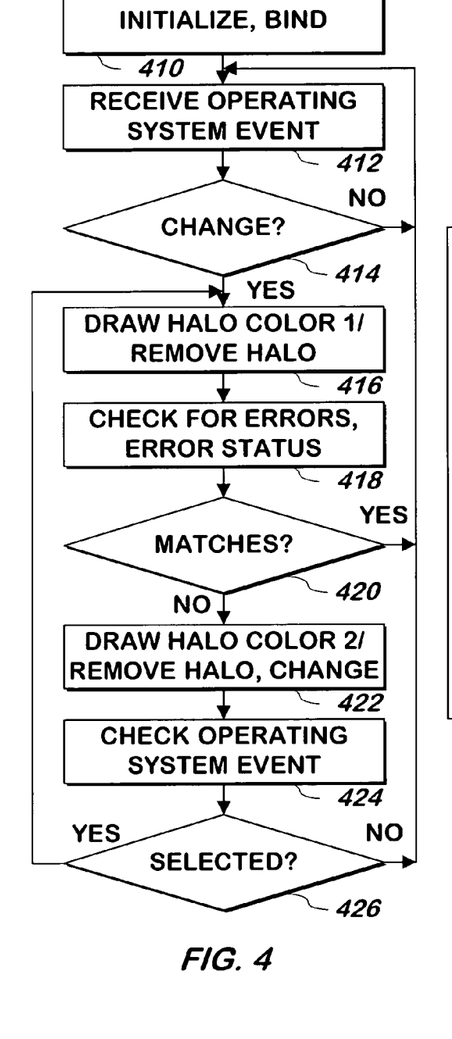
FIG. 4 is a flowchart illustrating a method of displaying a user interface control according to one embodiment of the present invention.

Referring now to FIG. 4, a method of displaying a user interface control is shown according to one embodiment of the present invention. The user interface control is initialized 410 as described above. An operating system event is received 412 and if the event corresponds to a change in the appearance of the user interface control 414, the user interface control is changed 416, either by adding to the user interface control a gradient of color having a first color or by removing a gradient of color from the user interface control as described above. The user interface control data may be checked for errors and the error status of the control is checked to determine if it matches the current error status of the user interface control data 418. If the error status of the user interface control matches the current error status of the user interface control data 420, the method continues at step 412 and otherwise 420, a gradient of color having a second color is added, or the gradient of color on the control is removed 422 and the error status of the control is changed, all as described above.

The prior operating system event is checked to determine if it corresponded to the selection of a control or the pressing of the enter key in the text of the control 424, and if the control is still selected 426, the method continues at step 416. Otherwise 424, the method continues at step 412.

Figure 3E:
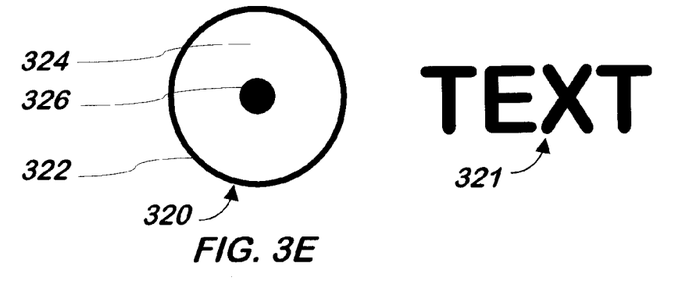
FIGS. 3E and 3F are diagrams of another representative user interface control, a radio button, according to one embodiment of the present invention.

A gradient of color may be used on other user interface controls as well. For example, a gradient of color can be used with a conventional radio button, which itself may be used to indicate, and allow the user to change, status of one or more variables. Referring now to FIG. 3E, radio button 320 has border 322, interior 324 and selection indicator 326 that indicates the selection of button corresponding to button text 321.

Figure 3F:
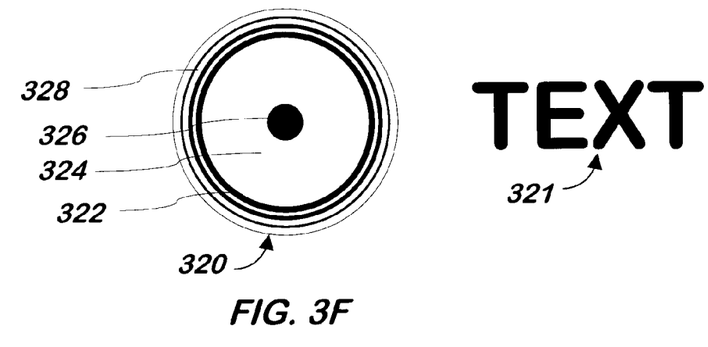

The button 320 of FIG. 3E is shown with the gradient of color displayed in FIG. 3F. Referring now to FIG. 3F, gradient of color 328 may be displayed to indicate a mouse-over state when the button is unselected and selection indicator 326 is off. If the user moves the mouse away from button 320, gradient of color 328 returns to an off, or invisible state when the button is not selected as described above. When selection indicator 326 is on or displayed, because the button 320 is selected, gradient of color 328 may also be displayed. As a result, during mouse over, at a time when selection indicator 326 and gradient of color 328 are both displayed, interior 324 is illuminated in the same or similar color as gradient of color 328 to indicate mouse over, and not illuminated at other times, except to indicate a button press state, when a user holds the mouse cursor over the button and holds down the mouse button indicating that the button is to be pressed.

Referring now to FIGS. 2, 3E and 3F, to implement such a user interface control, status variables may be employed and set and/or checked by application program logic 230 and/or event handlers 250-258. For example, operating system event handlers 250-252 may operate a set of radio buttons similar or identical to radio button 320 in a manner similar to that described above for the text box. When a user presses the radio button 320, operating system event handler 250 displays it as described above and retains its state in a variable in system memory. When the user mouses over the control 320, operating system event handler 252 either displays the gradient of color 328 or the colored interior 324 as described above based on the status variable.

In one embodiment, user interface manager 232 "grays out" the border 322 and the text 321 of any disabled radio button.

Figure 5:
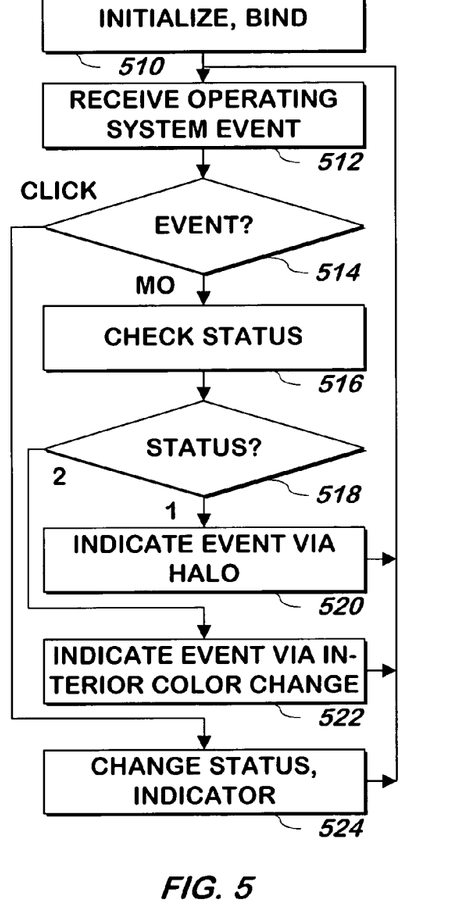
FIG. 5 is a flowchart illustrating a method of displaying a user interface control according to one embodiment of the present invention.

Referring now to FIG. 5, a method of displaying a user interface control is shown according to one embodiment of the present invention. The control is initialized and bound 510 as described above. An operating system event is received 512 and if the operating system event corresponds to a mouse over 514, a status is checked 516 and if the status is in a first state 518, the operating system event is indicated via the display of a gradient of color 520 and the method continues at step 512. If the status is in a second state 518, the operating system event is indicated via the display of the color in the interior of the control 522 and the method continues at step 512. The status is the status of the radio button in one embodiment.

If the operating system event received in step 512 corresponds to a click 514, a stored indicator of the status is changed between the two states and a displayed indicator of the status on the control is changed between the two states 524 and the method continues at step 512.

Figure 3G:
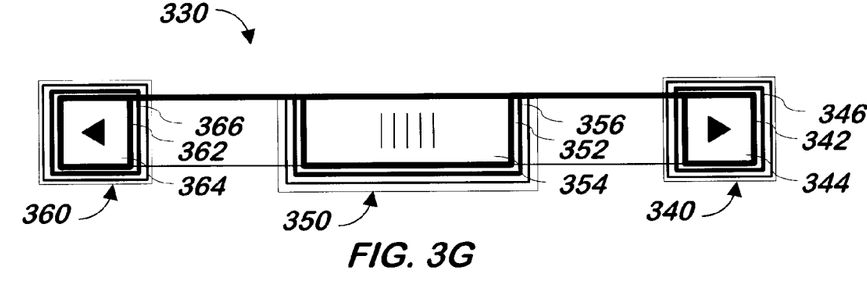
FIGS. 3G and 3J are diagrams of another representative user interface control, a list box, according to one embodiment of the present invention.

Referring now to FIG. 3G, in one embodiment, the user interface control having a gradient of color is a scroll bar 330. A scroll bar 330 has three sub controls, arrows 340, 360 and slider 350 (in addition to the track on which slider slides), each of which is treated as a separate user interface control, referred to herein as either a user interface control or, for ease of description, as a sub control. In such embodiment, each sub control 340, 350, 360 may have its own operating system event handler 250-254 for each operating system event, such as a mouse over, or the control 330 may have a single operating system event handler 250-254 for any such event. In such case, the operating system event handler identifies the sub control 340, 350, 360 corresponding to the event based on the position of the mouse and then displays the gradient of color 342, 352, 362 or interior portion 344, 354, 364 corresponding to the sub control 340, 350, 360 over which the mouse cursor was positioned at the time of the event, as described in more detail below.

In one embodiment, when the user mouses over a sub control 340, 350, 360, the gradient of color 346, 356, 366 extending from at or near the border 342, 352, 362 corresponding to the sub control 340, 350, 360 under the mouse cursor is displayed by an operating system event handler for the control 330 or sub control 340, 350, 360 that handles the mouse over operating system event. The gradient of color 346, 356, 366 is removed and the control redisplayed when by an operating system event handler for the control 330 or sub control 340, 350, 360 that handles the response to the track-moouseevent "WM_MOUSELEAVE" message or other similar event that occurs when the mouse is no longer over the control. When the user clicks (or drags) the mouse when the mouse is over a sub control 340, 350, 360, the operating system event handler for the control 330 or sub control 340, 350, 360 that handles the clicked event displays a colored fill for the interior 344, 354, 364 of the sub control 340, 350, 360 that is the same or similar color as the gradient of color 346, 356, 366. In one embodiment, for this control, the gradient of color may or may not be displayed when the user clicks or drags the mouse. If the gradient of color is not displayed, the gradient of color is removed, and the colored fill added, and otherwise, the colored fill is added without removing the gradient of color. When the mouse is released, the control is redrawn by the event handler 250-254 handling that event, either with the gradient of color displayed on the subcontrol, if the mouse is still over the sub control, or without the gradient of color, if the mouse is no longer over the sub control. In one embodiment, if the user clicks the track on which slider 350 slides, it is treated for purposes of displaying an indicator as if the sub control 340, 360 that is on the side of slider 350 on which the track was clicked, was clicked.

In one embodiment, the gradient of color 356 does not extend all the way around slider 350, instead extending around only three of its four sides. Other controls may similarly have a gradient of color that extends partially around, their borders in other embodiments of the present invention. The term "halo" may be used herein to define a gradient of color that extends at least in one direction, such as outward, from or near a border of a control at least some of the way around the border.

Figure 6:
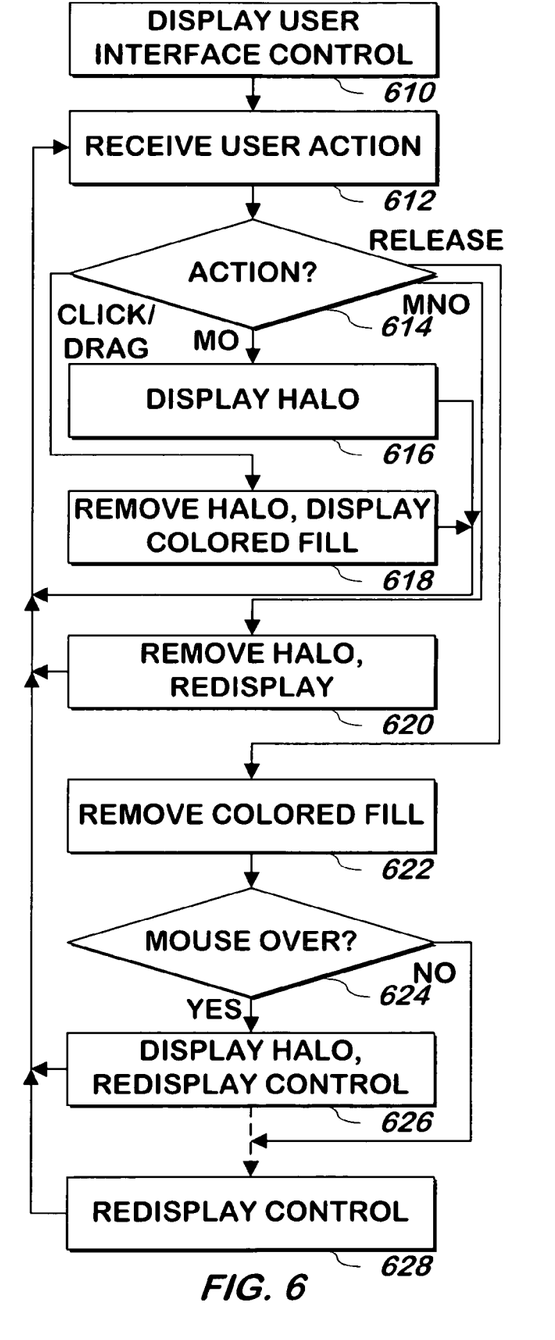
FIG. 6 is a flowchart illustrating a method of displaying a user interface control according to one embodiment of the present invention.

Referring now to FIG. 6, a method of displaying a user interface control is shown according to one embodiment of the present invention. A user interface control, such as a sub control of a scroll bar, is displayed 610 as described above. An event such as an operating system event is received 612. If the operating system event is a mouse over 614, a gradient of color extending at least in one direction, such as outward, from at least near at least some of the border of the sub control is displayed 616 (and the control or sub control may be redisplayed) and the method continues at step 612. If the operating system event indicates the mouse is no longer over the sub control 614, the gradient is removed from the sub control and the sub control may be redisplayed 620 and the method continues at step 612.

If the event received in step 612 is a click or a drag 614, the gradient of color may be removed and an interior portion of the sub control may be filled using a color similar to or identical to the darkest part of the gradient of color and the control or sub control may be optionally redisplayed 618, and the method continues at step 612. If the event received at step 612 is a release of the mouse button 614 following the sub control being clicked or dragged, the colored fill is removed 622 and if the mouse is still over the sub control 624, the gradient of color is displayed extending outward from at least a portion of the sub control 626 and the control or sub control may be redrawn 628 (as indicated by the dashed line) and the method continues at step 612. If the mouse is no longer over the sub control 624, the control or sub control is redrawn 628 without the gradient of color or fill and the method continues at step 612.

Figure 3H:
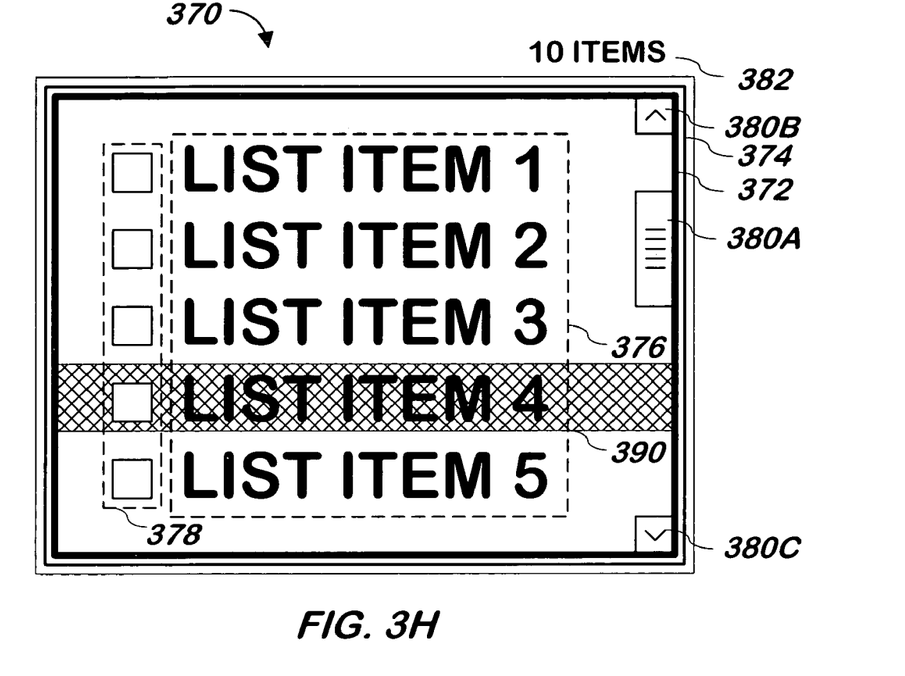
FIG. 3H is a diagram of another representative user interface control, a scroll bar, according to one embodiment of the present invention.

Another user interface control is a list box user interface control. Referring now to FIGS. 2 and 3H, a list box control 370 is shown according to one embodiment of the present invention. A list box control contains one or more list items 376. When the list box control has focus, the operating system event handler 250-254 for the list box control that receives program control upon the list box control receiving the focus, displays a gradient of color 374 extending at least in one direction, such as outward at or near some or all of the border of the list box control.

In one embodiment, the list box control contains one or more scroll bars 380A/380B/380C, allowing the user to (scroll through the items in the list box. The scroll bars 380A/380B/380C may appear on the inside or outside of the border 372 on either side or the top or bottom of the of the list box 370, allowing vertical scrolling, horizontal scrolling or both, through the items in the list box. The display of the items in the list is under control of one or more event handlers 250-258 for each sub control of each scroll bar, which displays the items using conventional scrolling techniques, and may also operate indicators on the scroll bar sub controls themselves as described above.

Each of the items 376 in the list box 370 may have the same or a different icon, which may be displayed in locations 378 by event handlers 250-258. The number of items in the list or the number of the items in the list that are not hidden or disabled and displayed "grayed out" because they may not be selected may be displayed by such event handlers 250-258 on or near the list box control. In FIG. 3H, this number is shown at 382, along with the word "items."

Figure 3J:
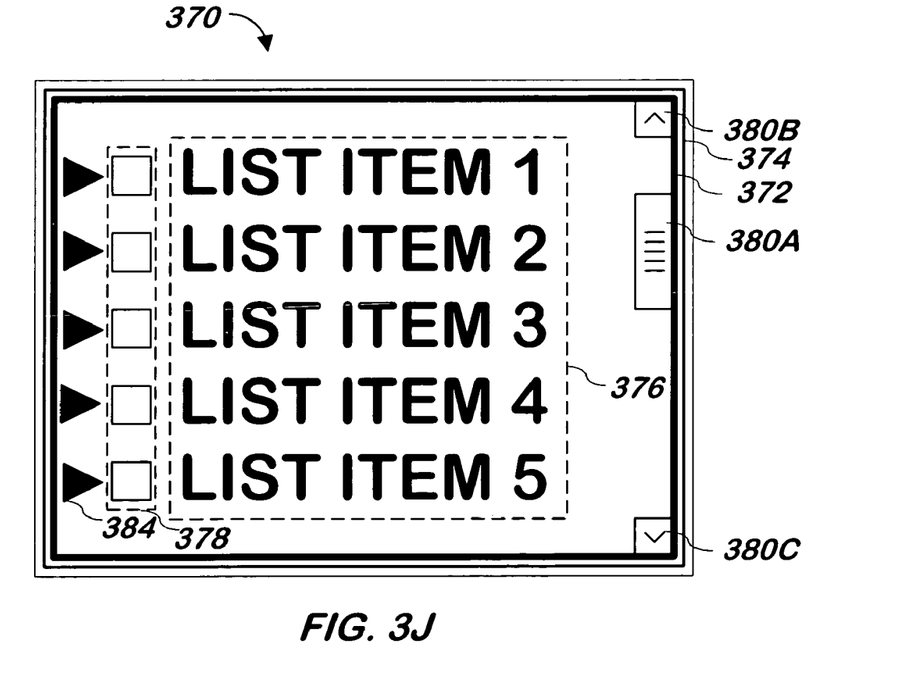

In one embodiment, the items in the list have a hierarchy, with each level of the hierarchy indented according to the level of the hierarchy. In one embodiment, the list may be expanded or collapsed via icons that allow the user to view (i.e. "expand") items that are child items of an item corresponding to the icon, or to hide (i.e. "collapse) such items. An example of the icons is shown in FIG. 3J at 384. Event handlers 250-254 that handle the click of the icons operate the display using conventional hierarchical list box techniques.

In one embodiment, each item in the list may have a conventional radio button to allow selection of an item in the list, or a conventional check box to allow selection of multiple items in the list in addition to, or in place of conventional list box item selection mechanisms. Such radio buttons or check boxes may be displayed in locations 378. An event handler 250-254 for the radio buttons or check boxes may operate indicators on the radio buttons or check boxes as described above and also change the state of a "selected" variable associated with each of the list items in accordance with the user's selections.

The currently selected item in the list may be highlighted such as by highlighting the list item text in the list box using the same or similar color as the gradient of color 374 that radiates at least outward from border 372. In FIG. 3H, the text for list item 4 is highlighted in this manner as shown in the Figure by bar 390. The operating system event handler 250-254 that handles control during mouse over of a list item receives the list box item under the mouse cursor, and highlights that item using the same or similar color as the darkest part of the gradient of color, and in one embodiment, the edges of the highlighting fall off in a gradient that is similar or identical to the gradient used for the gradient of color 374.

In one embodiment, some or all of the features displayed above are under control of application program logic 230, which may enable or disable the display, and the location of such display, of any or all of such features. For example, application program logic 230 may display scroll bars either vertically, and at either side of the list box, or horizontally, on the top or the bottom of the list box. Similarly, application program logic 230 may enable the display and location of the number of items in the list. This is performed by application program logic setting the value of certain variables associated with the list box control. The event handlers 250-258 that display features of the list box control read the value of the any such variables and display the list box control according to the values stored therein. Thus, the features can be added or removed from a list box user interface control as needed, even during operation of the program.

Other controls may have borders of the control or a portion of the control with a gradient of color that extends in at least one direction, such as outside, at or near at least a portion of the border of the control during some of the time, but not all of the time, the control is displayed, where the gradient of color is displayed or not displayed in response to an event such as an operating system event or a logic event. For example, a button that can be pressed may have a gradient of color illuminated extending from some or all of the border of the button to indicate mouse over or a button press.

The user interface controls described herein have been described with reference to certain features, however each such control also includes conventional features of that control, operated via event handlers as described above. Although the gradient of color is illustrated for each of the various controls as extending at least outward from at least a part of the border of the control or sub control, the gradient of color may also or instead, extend inward from at least part of the border or may extend outward or inward from a location nearby at least part of the border of the control or sub control.

Figure 7:
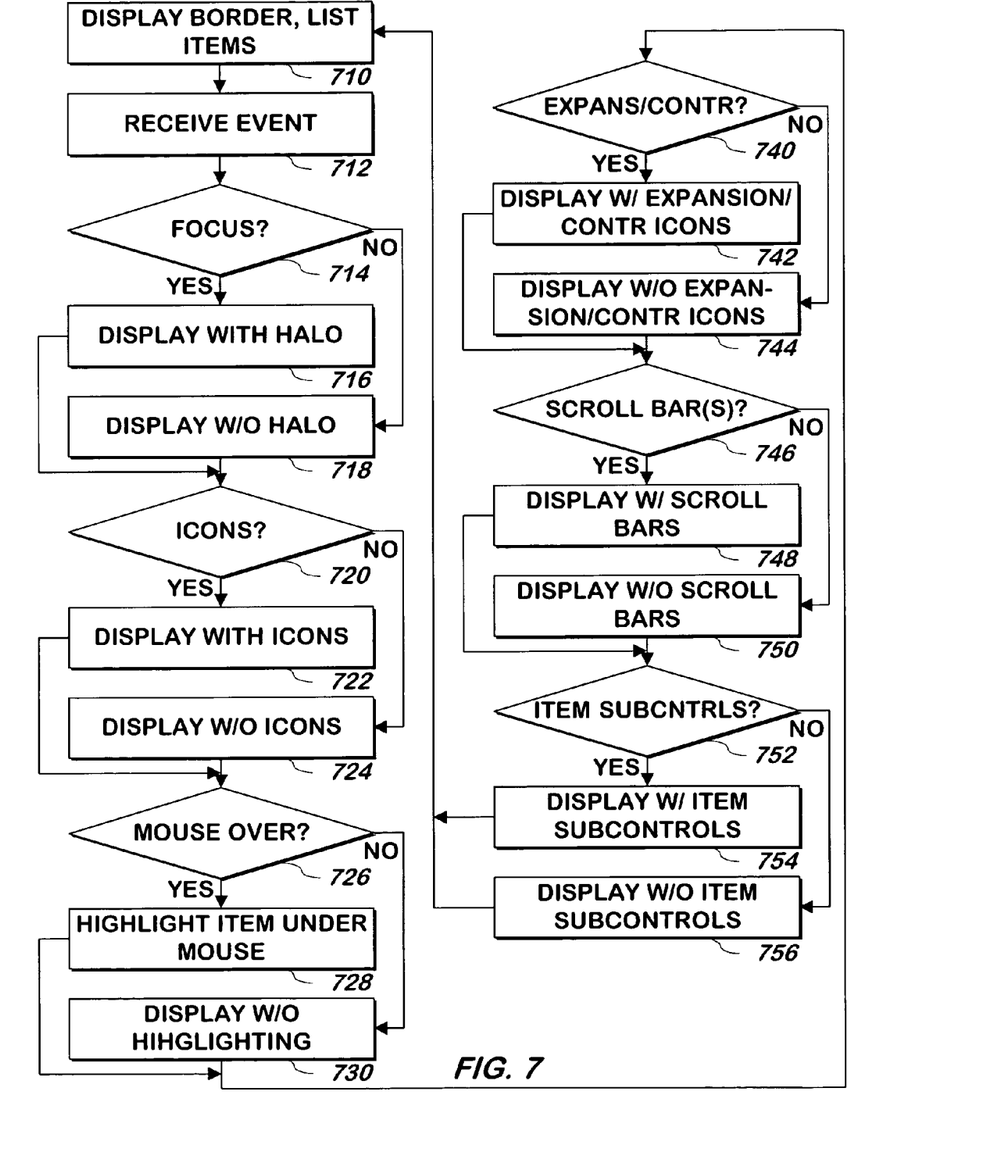
FIG. 7 is a flowchart illustrating a method of displaying a list box user interface control according to one embodiment of the present invention.

Referring now to FIG. 7, a method of displaying a list box user interface control is shown according to one embodiment of the present invention. The border of the list box control is displayed enclosing the items in the list, which are also displayed 710. An operating system event or other type of event is received 712. If the list box control has focus 714, a gradient of color is displayed from or near the border 716 as described above and otherwise 714, a gradient of color is not displayed from or near the border 718 and the method continues at step 720.

If one or more icons have been associated with the items in the list and the display of the icons is enabled 720, the icons are displayed in the list box next to their associated list items 722 and otherwise 720, no such icons are displayed in the list box 724 and the method continues at step 726.

If the mouse is over a list item and highlighting of list items is enabled 726, the list item is highlighted as described above 728 and otherwise 726, no such highlighting is displayed 730 and the method continues at step 740.

If the list box control items are hierarchical 740, and expansion and contraction is enabled, the items are displayed with expansion/contraction icons 742 and otherwise 740, expansion/contraction icons are not so displayed 744 and the method continues at step 746.

If the list box control is to be displayed with one or more scroll bars 746, the one or more scroll bars are displayed near or adjacent to the border of the list box control in positions according to certain variables 748 and otherwise 746, such scroll bars are not displayed 750 and the method continues at step 752.

If subcontrols are to be displayed with each item to allow the selection of one item or more than one item 752, such subcontrols, which may be radio buttons, check boxes or other conventional user interface controls, are displayed in the list box near the associated item 754 and otherwise 752, such subcontrols are not displayed 756 and the method continues at step 710.

As described above, the various user interface controls are operated using event handlers. Each control may have its own set of one or more event handlers, with a different event handler handling a different event for that control. The appearance of the various user interface controls described herein can be controlled using variables, and each user interface control operates in the fashion of a conventional user interface control, in addition to the capabilities described herein.

The gradients of color are illustrated extending in one direction, outward, from the borders of the various user interface controls. The gradients of color may extend inward from the border in addition to, or in place of, extending outward, or the gradients of color may extend from an area near the borders of the controls, not from the borders of the controls, as illustrated.

In one embodiment, a window, web page or other displayed set of multiple user interface controls contains two or more of the types of user interface controls described above, and most or all of such user interface controls displayed in the window or control operate as described herein. In one embodiment, all or nearly all of the user interface controls displayed in the window or on the screen operate as described herein, providing feedback to the user in a consistent fashion to allow the user to rely on such feedback.

What is claimed is:

1. A computer-implemented method of displaying a user interface control comprising:
   receiving, by a processor of a computer system, an entry in a displayed user interface control, the user interface control configured to allow a user to provide the entry;
   determining, by the processor, that the entry corresponds to an event, wherein the event is generated when the user provides the entry in the user interface control, wherein the generated event comprises an error message event;
   in response to the determining, displaying, by the processor, a user interface control border defining at least one outer edge of the user interface control, the border corresponding to the generated event; and
   displaying, by the processor, a gradient of color extending in at least one direction outward from at least a portion of the user interface control border less than all the time the border is displayed, at least as long as the generated event is active.

2. The method of claim 1 wherein the gradient of color is used to distinguish the event from other events.

3. The method of claim 1, wherein the user interface control is displayed as part of a plurality of user interface controls, simultaneously displayed, the plurality of user interface controls comprising the user interface control and at least one other user interface control, each of at least one of the at least one other user interface control displayed by:
   displaying a user interface control border defining at least one outer edge of the at least one other user interface control; and
   displaying a gradient of color extending in at least one direction outward from at least a portion of the at least one other user interface control border less than all the time the border is displayed.

4. The method of claim 1, further comprising removing the gradient of color from display upon determining that the event is no longer active.

5. A system for displaying a user interface control, the system comprising:
   a processor; and
   a computer program product having computer readable program code encoded thereon comprising instructions to cause the processor to perform operations comprising:
      receiving an entry in a displayed user interface control, the user interface control configured to allow a user to provide the entry;
      determining that the entry corresponds to an event, wherein the event is generated when the user provides the entry in the user interface control, wherein the generated event comprises an error message event;
      in response to the determining, displaying a user interface control border defining at least one outer edge of the user interface control, the border corresponding to the generated event; and
      displaying a gradient of color extending in at least one direction outward from at least a portion of the user interface control border less than all the time the border is displayed, at least as long as the generated event is active.

6. The system of claim 5, wherein the gradient of color is used to distinguish the event from other events.

7. The system of claim 5, the operations further comprising:
   displaying a user interface control border defining at least one outer edge of at least one other user interface control displayed simultaneously with the user interface control; and
   displaying a gradient of color extending at least one direction outward from at least a portion of the other user interface control border, the gradient displayed less than all the time the border of the other user interface control is displayed.

8. The system of claim 5, the operations additionally comprising removing the gradient of color from display upon determining that the event is no longer active.

9. A computer program product having computer readable program code encoded thereon for displaying a user interface control, the computer program product comprising computer readable program code devices configured to cause a computer system to:
   receive an entry in a displayed user interface control, the user interface control configured to allow a user to provide the entry;
   determine that the entry corresponds to an event, wherein the event is generated when the user provides the entry in the user interface control, wherein the generated event comprises an error message event;
   in response to the determining, display a user interface control border defining at least one outer edge of the user interface control, the border corresponding to the generated event; and
   display, less than all the time the border is displayed, a gradient of color extending in at least one direction outward from at least a portion of the user interface control border, at least as long as the generated event is active.

10. The computer program product of claim 9 wherein the gradient of color is used to distinguish the event from other events.

11. The computer program product of claim 9, wherein the user interface control is displayed as part of a plurality of user interface controls, simultaneously displayed, the plurality of user interface controls comprising the user interface control and at least one other user interface control, each of at least one of the at least one other user interface control displayed by:
   computer readable program code devices configured to cause the computer system to display a user interface control border defining at least one outer edge of the at least one other user interface control; and
   computer readable program code devices configured to cause the computer system to display a gradient of color extending in at least one direction outward from at least a portion of the at least one other user interface control border less than all the time the border is displayed.

12. The computer program product of claim 9, the computer readable program code devices configured to cause the computer system to remove the gradient of color from display upon determining that the event is no longer active.

* * * * *